United States Patent
Burd et al.

(10) Patent No.: US 8,837,074 B1
(45) Date of Patent: Sep. 16, 2014

(54) METHOD AND SYSTEM FOR COMPENSATING FOR TRACK SQUEEZE

(75) Inventors: Gregory Burd, San Jose, CA (US); Nitin Nangare, Santa Clara, CA (US)

(73) Assignee: Marvell International, Ltd., Hamilton (BM)

( * ) Notice: Subject to any disclaimer, the term of this patent is extended or adjusted under 35 U.S.C. 154(b) by 357 days.

(21) Appl. No.: 13/050,315

(22) Filed: Mar. 17, 2011

Related U.S. Application Data

(60) Provisional application No. 61/325,208, filed on Apr. 16, 2010.

(51) Int. Cl.
G11B 5/596 (2006.01)
G11B 27/36 (2006.01)
G11B 5/004 (2006.01)
G11B 5/024 (2006.01)
G11B 5/02 (2006.01)

(52) U.S. Cl.
USPC .............. 360/75; 360/31; 360/53; 360/54; 360/57; 360/66

(58) Field of Classification Search
None
See application file for complete search history.

(56) References Cited

U.S. PATENT DOCUMENTS

| | | | |
|---|---|---|---|
| 6,185,063 B1 * | 2/2001 | Cameron | 360/78.04 |
| 6,442,705 B1 * | 8/2002 | Lamberts | 714/2 |
| 6,549,362 B1 * | 4/2003 | Melrose et al. | 360/77.04 |
| 6,697,209 B2 | 2/2004 | Hughes et al. | |
| 6,724,702 B2 | 4/2004 | Taguchi et al. | |
| 6,862,155 B2 * | 3/2005 | Yang et al. | 360/77.02 |
| 6,963,528 B2 | 11/2005 | Ogura | |
| 7,082,007 B2 * | 7/2006 | Liu et al. | 360/77.02 |
| 7,126,890 B2 | 10/2006 | Learned et al. | |
| 7,209,305 B2 * | 4/2007 | Chan et al. | 360/31 |
| 7,218,665 B2 | 5/2007 | McElwain | |
| 7,423,828 B2 | 9/2008 | Emo et al. | |
| 7,457,075 B2 * | 11/2008 | Liu et al. | 360/77.04 |
| 7,567,397 B2 * | 7/2009 | Lu | 360/31 |
| 7,768,729 B2 * | 8/2010 | Moser et al. | 360/31 |
| 7,965,465 B2 * | 6/2011 | Sanvido et al. | 360/60 |
| 8,014,097 B1 * | 9/2011 | Sanvido | 360/60 |
| 8,125,723 B1 * | 2/2012 | Nichols et al. | 360/31 |
| 8,139,301 B1 | 3/2012 | Li et al. | |
| 8,259,409 B2 | 9/2012 | Braganca et al. | |
| 8,300,339 B1 | 10/2012 | Nangare et al. | |
| 8,441,750 B1 | 5/2013 | Nangare et al. | |
| 8,638,513 B1 | 1/2014 | Burd | |
| 8,638,522 B2 | 1/2014 | Matsuo et al. | |
| 2003/0218955 A1 | 11/2003 | Isshiki et al. | |
| 2007/0074083 A1 | 3/2007 | Olds et al. | |
| 2007/0177292 A1 | 8/2007 | Bui et al. | |
| 2008/0151704 A1 | 6/2008 | Harada | |
| 2008/0174905 A1 | 7/2008 | Ueda | |
| 2011/0209026 A1 | 8/2011 | Xia et al. | |

* cited by examiner

Primary Examiner — K. Wong

(57) ABSTRACT

A storage device includes a storage medium having a plurality of tracks of data. Reading apparatus for reading a current track of data that has been subject to previous encroachment to an extent from at least one adjacent track of data includes a write head that writes interfering data to the adjacent track of data while intentionally encroaching at least to that extent onto the current track of data, and circuitry that recovers data on the current track of data using the interfering data. A method for reading a current track of data, that has been subject to previous encroachment to an extent from at least one adjacent track of data, includes writing interfering data to the adjacent track of data while intentionally encroaching at least to that extent onto the current track of data, and recovering data on the current track of data using the interfering data.

14 Claims, 5 Drawing Sheets

METHOD AND SYSTEM FOR COMPENSATING FOR TRACK SQUEEZE

CROSS REFERENCE TO RELATED APPLICATION

This claims the benefit of commonly-assigned U.S. Provisional Patent Application No. 61/325,208, filed Apr. 16, 2010, which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

This disclosure relates to a method and system for reading data that has been recorded in an arrangement of tracks on a storage medium and is read by a read head that moves relative to the surface of the storage medium. More particularly, this disclosure relates to compensating for a track squeeze condition resulting from one or more off-track conditions during the writing of an adjacent track or tracks.

In magnetic recording, as one example of a type of recording in which reading and writing are performed by a head that moves relative to the surface of the storage medium, data may be written in circular tracks on a magnetic disk. To write data on a given track, the write head may be centered on that particular track. However, sometimes the write head may deviate from its ideal path and stray "off-track," with part of the head over the current track (i.e., the track to be written) and part of the head over an adjacent track. This results in a portion of the data that may have been written previously on the adjacent track being overwritten. Later, when what had been the adjacent track is the current track to be read, what had been the current track is now the adjacent track to the track to be read. At that time, the signal that is read from the now-current track may include inter-track interference ("ITI") from the now-adjacent track. Moreover, if the track on the other side of the now-current track also had been written after the now-current track was written and also experienced an off-track condition during that write operation, the signal from the now-current track may also include ITI from the other adjacent track, making it even more difficult to read. The encroachment on the current track from the adjacent tracks on either side of the current track gives rise to a condition that may be referred to as "track squeeze."

If an ITI-generating event on a particular current track resulting from an off-track condition during writing of an adjacent track is detected before the adjacent track is written again, then it may be possible to recover the data on the particular current track by using ITI cancellation, such as the ITI cancellation technique disclosed in copending, commonly-assigned U.S. patent application Ser. No. 12/882,802, filed Sep. 15, 2010 and hereby incorporated by reference herein in its entirety. However, many times it is the case that a particular track will have been "squeezed" by multiple ITI events on its adjacent tracks before an attempt is made to read that particular track. In such a case, ITI cancellation techniques such as those described may not be useful, because the current data on the adjacent tracks may not be the data causing interference on the current track, but rather the data causing the interference may have been overwritten in the interim and at most only unusable remnants of those data may remain.

SUMMARY

An embodiment of a method for reading a current track of data, that has been subject to previous encroachment to a respective extent from at least one adjacent track of data, includes writing interfering data to the at least one adjacent track of data while intentionally encroaching at least to the respective extent onto the current track of data, and recovering data on the current track of data using the interfering data.

According to some embodiments, data from the at least one adjacent track of data is buffered prior to writing interfering data, and buffered data are restored to the least one adjacent track of data following recovering data on the current track of data. According to some embodiments, the interfering data are known interfering data.

According to some embodiments, the at least one adjacent track of data includes two adjacent tracks of data. A first one of the two adjacent tracks of data is on a first side of the current track of data, and a second one of the two adjacent tracks of data is one a second side of the current track of data. The previous encroachment includes a respective extent of encroachment from each respective one of the first and second ones of the two adjacent tracks, and the writing of interfering data includes writing interfering data to each respective one of the first and second ones of the two adjacent tracks while intentionally encroaching at least to the respective extent from the first and second ones of the two adjacent tracks onto the current track of data.

An embodiment of a storage device includes a storage medium having a plurality of tracks of data thereon. Reading apparatus for reading a current track of data that has been subject to previous encroachment to a respective extent from at least one adjacent track of data includes a write head that writes interfering data to the at least one adjacent track of data while intentionally encroaching at least to the respective extent onto the current track of data, and circuitry that recovers data on the current track of data using the interfering data.

Some embodiments include memory for buffering data from the at least one adjacent track of data prior to writing interfering data, wherein the circuitry restores buffered data to the at least one adjacent track of data following recovering data on the current track of data. According to some embodiments, the interfering data are known interfering data.

According to some embodiments, the at least one adjacent track of data includes two adjacent tracks of data. A first one of the two adjacent tracks of data is on a first side of the current track of data, and a second one of the two adjacent tracks of data is one a second side of the current track of data. The previous encroachment includes a respective extent of encroachment from each respective one of the first and second ones of the two adjacent tracks, and the write head writes interfering data to each respective one of the first and second ones of the two adjacent tracks while intentionally encroaching at least to the respective extent from the first and second ones of the two adjacent tracks onto the current track of data.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

This disclosure relates to a method and system for recovering data from a data track that has been "squeezed" by off-track recording of one or more adjacent tracks, particularly when those adjacent tracks have subsequently been overwritten so that the data causing the interference on the squeezed track are no longer available for use in recovering the squeezed track.

Figure 1:
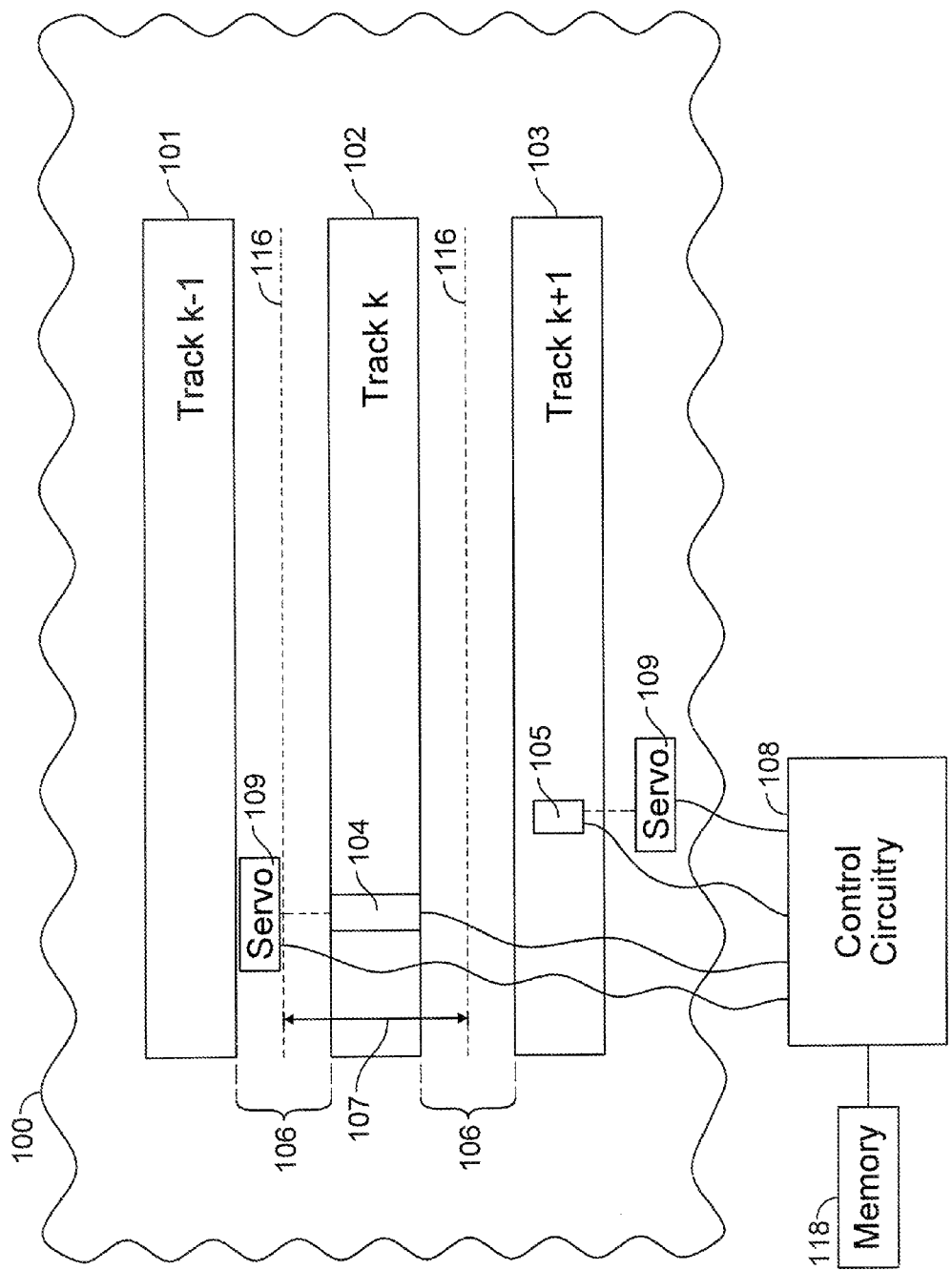
FIG. 1 is a simplified schematic view of a storage device with which the disclosure may be used.

FIG. 1 shows a simplified schematic view of a portion of a storage device showing three adjacent data tracks 101, 102, 103 on a storage medium 100, with a write head 104 and a read head 105. Guard bands 106 separate the tracks to prevent a small error in head positioning from causing unrecoverable damage to data previously written on an adjacent track. The distance 107 between the centerlines 116 of the guard bands 106 may be referred to as the track pitch. Control circuitry 108 controls the positioning of write head 104 and read head 105 via servo mechanisms 109, and also controls the reading and writing of data.

If read head 105 is not properly centered on track to be read, then part of the signal it picks up may come from the guard band or the adjacent track, leading to signal-to-noise ratio degradation. However, there is a significant margin of error allowed in read-head positioning because read head 105 is relatively smaller than write head 104 as compared to the track width. Moreover, a misaligned read head will not overwrite data on an adjacent track, and if necessary the read operation can simply be repeated with read head 105 properly aligned to obtain the correct data. On the other hand, if write head 104 is not properly positioned, it can overwrite data on an adjacent track, and the margin for error is smaller because write head 104 is relatively larger.

Figure 2:
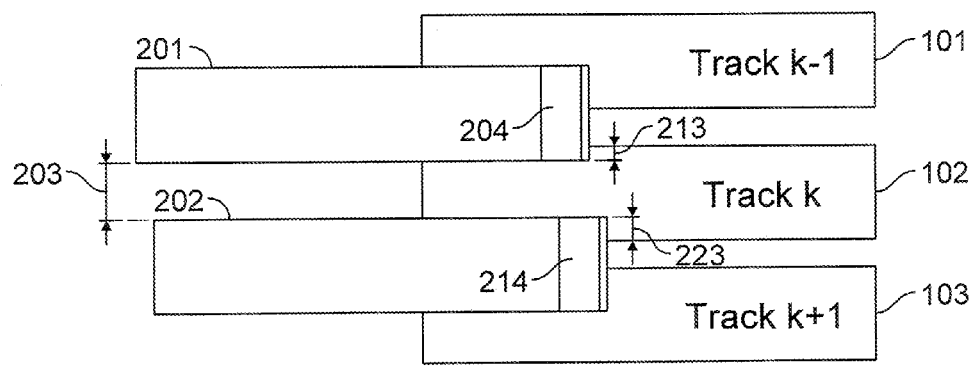
FIG. 2 is a view similar to FIG. 1 showing the formation of a simple track squeeze condition.

FIG. 2 shows how a track squeeze condition may occur. Here, track k (102) is the track of interest and was previously written, so that data of interest are present on track k (102). Some time after the data of interest were written onto track k (102), a first set of other data 201 were written onto track k−1 (101), and during that write operation, write head 204 was off-track, in the direction of track k (102). Similarly, some time after the data of interest were written onto track k (102), a second set of other data 202 were written onto track k+1 (103), and during that write operation, write head 214 was off-track, in the direction of track k (102). This resulted in a "squeeze" of track k (102) so that only area 203 is free of interference, while area 213 is subject to interference from the track k−1 (101) data, and area 223 is subject to interference from the track k+1 (103) data.

It should be noted that while the two write operations 201, 202 are shown together in FIG. 2, it is not meant to imply that the two operations necessarily occur simultaneously, or that the storage device in question actually has two separate write heads 204, 214 that can perform two separate simultaneous write operations. Although such a device may exist, write heads 204, 214 more commonly would represent two different temporal instances of write head 104.

If the situation shown in FIG. 2 represented the maximum extent of overwriting of the data on track k (102), track k (102) could be recovered by using an ITI cancellation technique such as that described in above-incorporated application Ser. No. 12/882,802, because the data from adjacent tracks k−1 (101) and k+1 (103) that caused the ITI would still be present on those adjacent tracks to be used in the cancellation technique.

Figure 3:
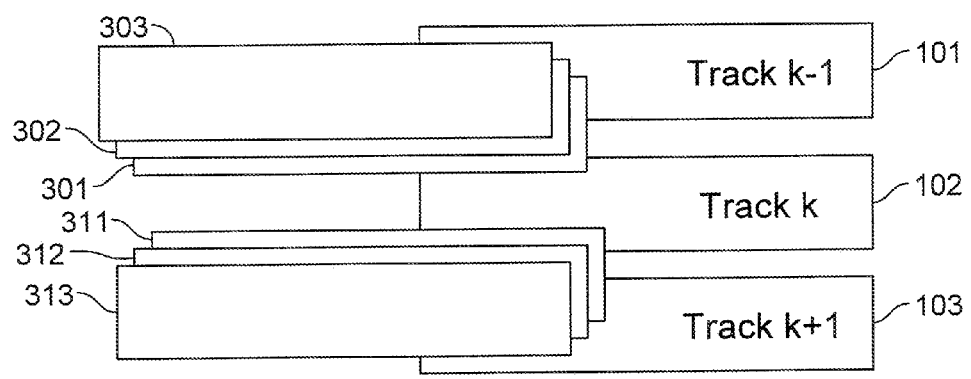
FIG. 3 is a view similar to FIG. 2 showing the formation of a more complex track squeeze condition.

However, frequently the situation is that shown in FIG. 3, where each of adjacent tracks k-1 (101) and k+1 (103) has been rewritten multiple times 301, 302, 303, or 311, 312, 313, after the data of interest have been written onto track k (102). Because the ITI on track k (102) is the result of that writing 301, or 311, that encroached furthest into track k (102), and those data may no longer be available (or only small, unusable remnants might be available), the aforementioned ITI cancellation technique may not be able to be used. Even if the writing 301, or 311, that encroached furthest into track k (102) were the most recent writing, if too much time had passed after that writing 301, or 311, before an attempt to read track k (102), the data from writing 301, or 311, might not still be available (and might not be properly readable from its intended track k−1, k+1 (102, 103) because of interference from track k (102)).

Figure 4:
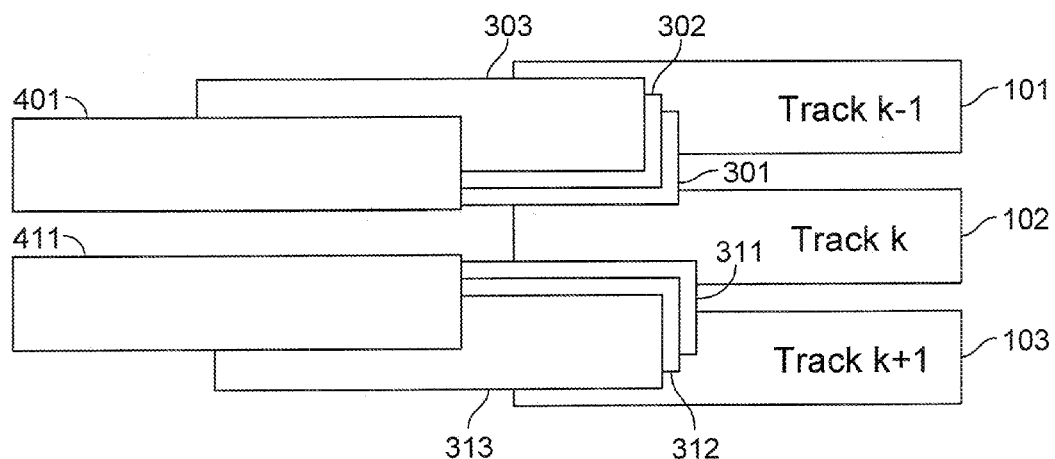
FIG. 4 shows the writing of interfering data to overcome the track squeeze condition of FIG. 3.

Therefore, in accordance with an embodiment of the present disclosure, and as shown in FIG. 4, data on the squeezed track (track k (102)) are recovered by first buffering the current data on the adjacent tracks into memory 118 (FIG. 1) and intentionally writing new, known, interfering data 401, 411 to the adjacent tracks, and then performing an ITI cancellation technique such as that described above and in the above-incorporated application Ser. No. 12/882,802. Afterwards, the buffered data from the adjacent tracks may be restored from memory 400 to those tracks.

The new known interfering data 401, or 411, should intentionally encroach into track k (102) at least as far as the writing 301, or 311, that encroached furthest into track k (102), and preferably slightly further, as shown, so that the ITI on track k (102) results only from the new interfering data 401, or 411.

It may not be known in advance how far the new interfering data 401, or 411, should intentionally encroach on track k (102) in order to assure that they are the only detectable contribution to ITI. If that is the case, an iterative process may be used, according to which new interfering data 401, or 411, are written in a first pass in which they intentionally encroach by a minimum increment. An attempt is then made to read track k (102). If the data on track k (102) cannot be read properly (e.g., based on checksums, CRC, or other error-correction characteristics of the data), the interfering data 401, or 411, are written again to adjacent track k−1 or k+1 (101, 103), but intentionally encroaching further, and then another attempt is made. This process continues, with the intentional encroachment on track k (102) increasing until track k (102) can be properly read. According to one variant of this embodiment, the encroachment increases by same amount on each iteration, and that amount may be the aforementioned minimum increment.

In an alternative embodiment, it may be possible to know from write head servo data (e.g., a position error signal), how far the furthest encroachment of write head 204, 214 onto track k (102) was. In such an embodiment, that servo data may be used to set the amount of encroachment for writing interfering data 401, or 411, either eliminating the need for iteration as described above, or at least reducing the number of iterations by providing a more accurate starting point.

Figure 5:
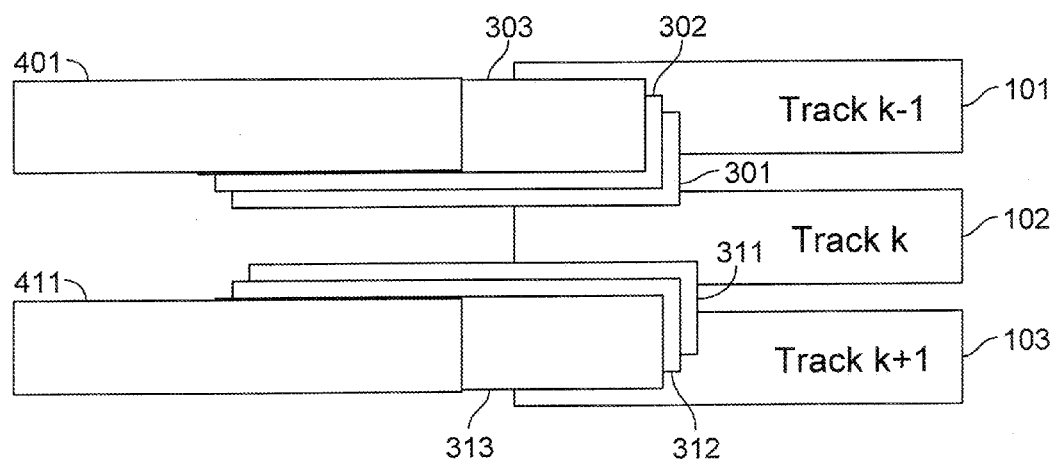
FIG. 5 shows one iteration of an iterative process in accordance with an embodiment of the disclosure.
Figure 6:
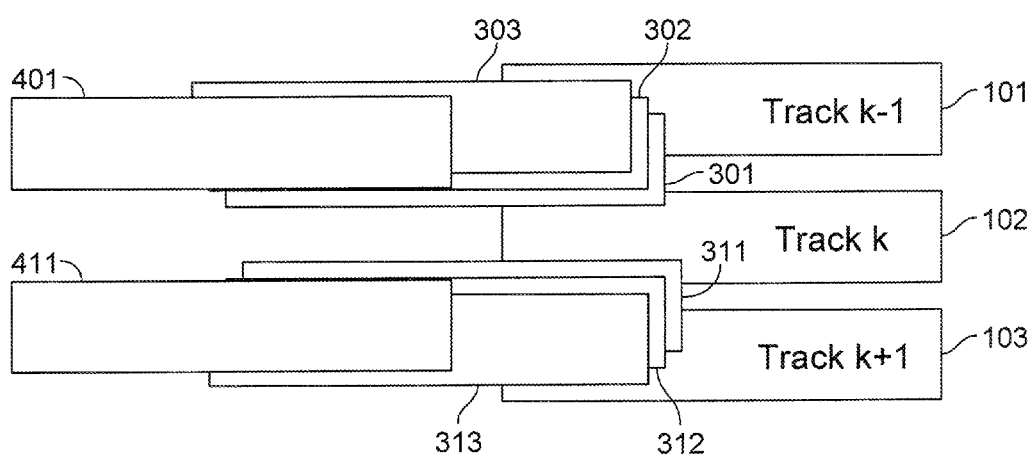
FIG. 6 shows another iteration of an iterative process in accordance with an embodiment of the disclosure.

FIG. 5 shows that the encroachment positions of new known interfering data 401, 411 may be only slightly offset from the positions of tracks k−1 (101) and k+1 (103) in a first pass of an iterative process. FIG. 6 shows a later pass of an iterative process, with new known interfering data 401, 411 reaching intermediate encroachment positions, with a greater degree of encroachment than in FIG. 5 but still not as far as encroaching data 301, 311. The encroachment positions of FIG. 6 may also be the initial encroachment positions where servo data are used to estimate the initial encroachment positions as discussed above. Note that while encroachment or squeezing from both adjacent tracks is shown in the drawings, it may be possible to have encroachment or squeezing from only one of the adjacent tracks.

Figure 7:
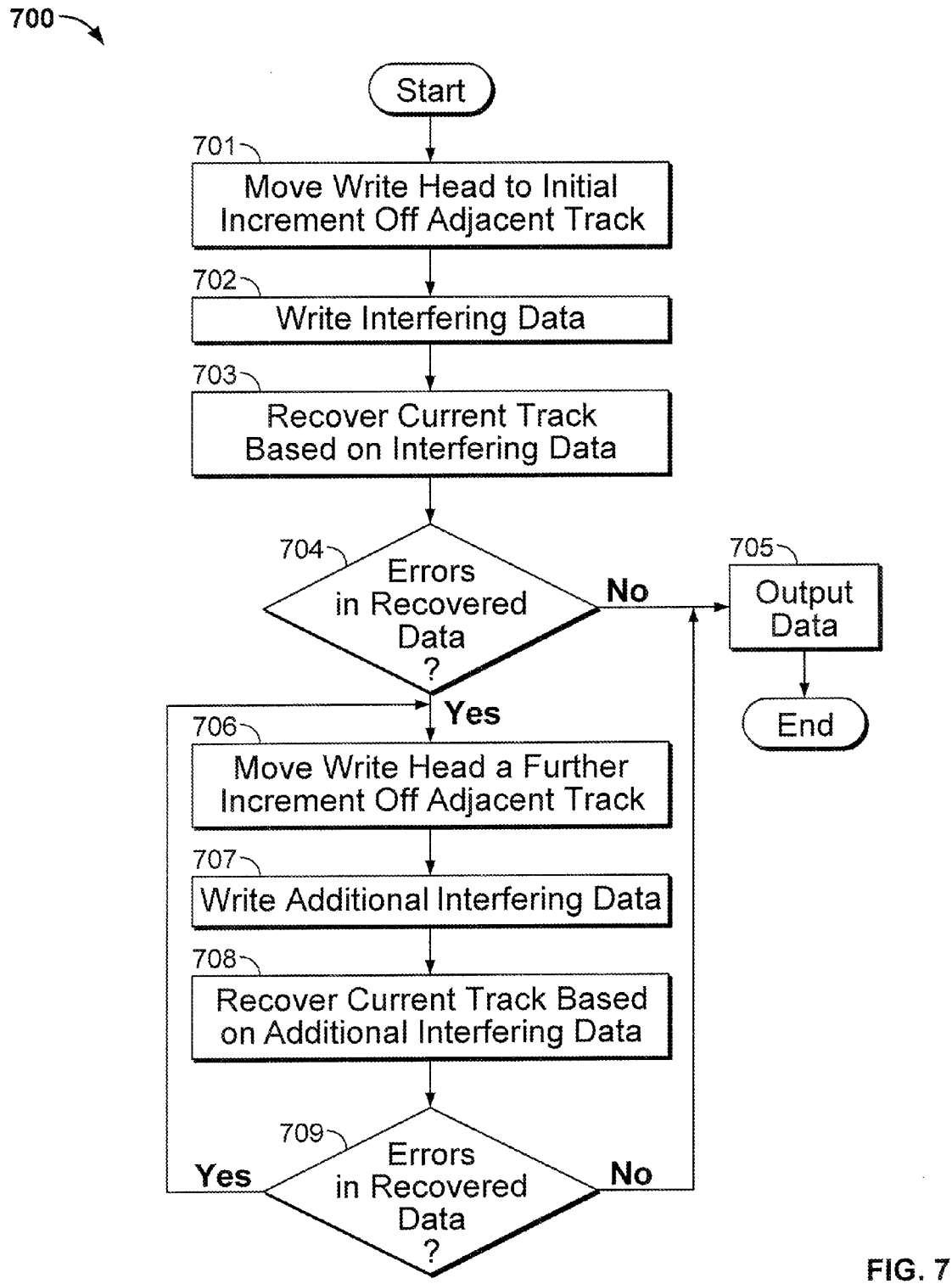
FIG. 7 is a flow diagram of an example of an iterative method according to the disclosure.

FIG. 7 is a flow diagram of an example of an iterative method 700 according to this disclosure. The indicated method operations may be undertaken on either one or both of the adjacent tracks as may be necessary. At 701, method 700 starts with the write head moved to its initial increment off the adjacent track. As discussed, this may be a default increment, or it may be determined by servo data. Next, at 702, an initial amount of interfering data are written to the adjacent track, and at 703 an attempt is made to recover data from the current track based on the interfering data written at 702.

At 704, the recovered data are examined for errors. If there are no errors, the initial off-track increment was correct, the data are output at 705 and method 700 ends. If at 704 there are errors in the recovered data, then at 706 the write head is moved to a further increment off the adjacent track, additional interfering data are written at 707, and at 708 an attempt is made to recover data from the current track based on the interfering data written at 707.

At test 709, the recovered data are examined for errors. If there are no errors, the new off-track increment was correct, the data are output at 705 and method 700 ends. If at test 709 there are errors in the recovered data, then method 700 returns to 706 where the write head is moved to another further increment off the adjacent track, and method 700 continues until there are no errors at 709.

Thus it is seen that a data storage system, and method of decoding stored data, in which contributions from one or more adjacent tracks may be accounted for in decoding one or more tracks of interest, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:
1. A method for reading a current track of data that has been subject to previous encroachment to a respective extent from at least one adjacent track of data, the method comprising:
    buffering data from the at least one adjacent track of data;
    after the buffering, intentionally writing interfering data to the at least one adjacent track of data while intentionally encroaching at least to the respective extent onto the current track of data;
    recovering data on the current track of data using the interfering data; and
    following the recovering data on the current track of data, restoring, to the least one adjacent track of data, the data buffered from the least one adjacent track of data.

2. The method of claim 1 wherein the interfering data are known interfering data.

3. The method of claim 2 wherein using the known interfering data comprises employing an interfering data cancellation technique that accepts known interfering data as an input.

4. The method of claim 1 further comprising determining extent of the previous encroachment from write head servo data.

5. The method of claim 4 wherein the writing interfering data and recovering data comprises:
    intentionally encroaching onto the current track of data by an initial increment,
    writing an initial instance of interfering data to the at least one adjacent track of data while intentionally encroaching onto the current track of data by the initial increment,
    recovering initial data on the current track of data using the initial instance of interfering data,
    checking for errors in the initial data,
    in absence of errors in the initial data, outputting the initial data, and
    on occurrence of errors in the initial data:
    intentionally encroaching onto the current track of data by a further increment,
    writing a further instance of interfering data to the at least one adjacent track of data while intentionally encroaching onto the current track of data by the further increment,
    recovering further data on the current track of data using the further instance of interfering data,
    checking for errors in the further data, and
    repeating the intentional encroaching onto the current track of data by a further increment, the writing a further instance, the recovering further data, and the checking for errors in the further data, until there is at most a threshold level of error in the further data, and then outputting the further data.

6. The method of claim 5 further comprising determining the initial increment of intentional encroachment from write head servo data.

7. The method of claim 1 wherein:
    the at least one adjacent track of data comprises two adjacent tracks of data;
    a first one of the two adjacent tracks of data is on a first side of the current track of data, and a second one of the two adjacent tracks of data is one a second side of the current track of data;
    the previous encroachment includes a respective extent of encroachment from each respective one of the first and second ones of the two adjacent tracks; and
    the writing interfering data comprises writing interfering data to each respective one of the first and second ones of the two adjacent tracks while intentionally encroaching at least to the respective extent from the first and second ones of the two adjacent tracks onto the current track of data.

8. A storage device comprising:
    a storage medium having a plurality of tracks of data thereon; and
    reading apparatus for reading a current track of data that has been subject to previous encroachment to a respective extent from at least one adjacent track of data, the reading apparatus comprising:
    a read head that reads data from the at least one adjacent track of data;
    memory that buffers the data from the at least one adjacent track of data;

a write head that, after the memory buffers the data from the at least one adjacent track of data, intentionally writes interfering data to the at least one adjacent track of data while intentionally encroaching at least to the respective extent onto the current track of data, and circuitry that recovers data on the current track of data using the interfering data, and that following recovering data on the current track of data, restores, to the least one adjacent track of data, the data buffered from the least one adjacent track of data.

9. The storage device of claim 8 wherein the interfering data are known interfering data.

10. The storage device of claim 9 wherein the circuitry that recovers data employs an interfering data cancellation technique that accepts known interfering data as an input.

11. The storage device of claim 8 further comprising a write head servo mechanism that records write head position data during the previous encroachment and uses the write head position data to determining the respective extent of intentional encroachment.

12. The storage device of claim 11 wherein:

the write head encroaches onto the current track of data by an initial increment, the write head writes an initial instance of interfering data to the at least one adjacent track of data while encroaching onto the current track of data by the initial increment, the circuitry recovers initial data on the current track of data using the initial instance of interfering data, the circuitry checks for errors in the initial data, on occurrence of at most a threshold amount of error in the initial data, the circuitry outputs the initial data, and on occurrence of errors in the initial data:

the write head intentionally encroaches onto the current track of data by a further increment, the write head writes a further instance of interfering data to the respective one of the at least one adjacent track of data while intentionally encroaching onto the current track of data by the further increment, the circuitry recovers further data on the current track of data using the further instance of interfering data, the circuitry checks for errors in the further data, and the intentional encroaching by the write head onto the current track of data by a further increment, the writing by the write head of a further instance, the recovering by the circuitry of further data, and the checking by the circuitry for errors in the further data, are repeated until there is at most a threshold amount of error in the further data, and then the circuitry outputs the further data.

13. The storage device of claim 11 wherein the initial increment of intentional encroachment is determined from write head servo data.

14. The storage device of claim 8 the at least one adjacent track of data comprises two adjacent tracks of data;

a first one of the two adjacent tracks of data is on a first side of the current track of data, and a second one of the two adjacent tracks of data is one a second side of the current track of data;

the previous encroachment includes a respective extent of encroachment from each respective one of the first and second ones of the two adjacent tracks; and the write head writes interfering data to each respective one of the first and second ones of the two adjacent tracks while intentionally encroaching at least to the respective extent from the first and second ones of the two adjacent tracks onto the current track of data.

\* \* \* \* \*